UNITED STATES PATENT OFFICE.

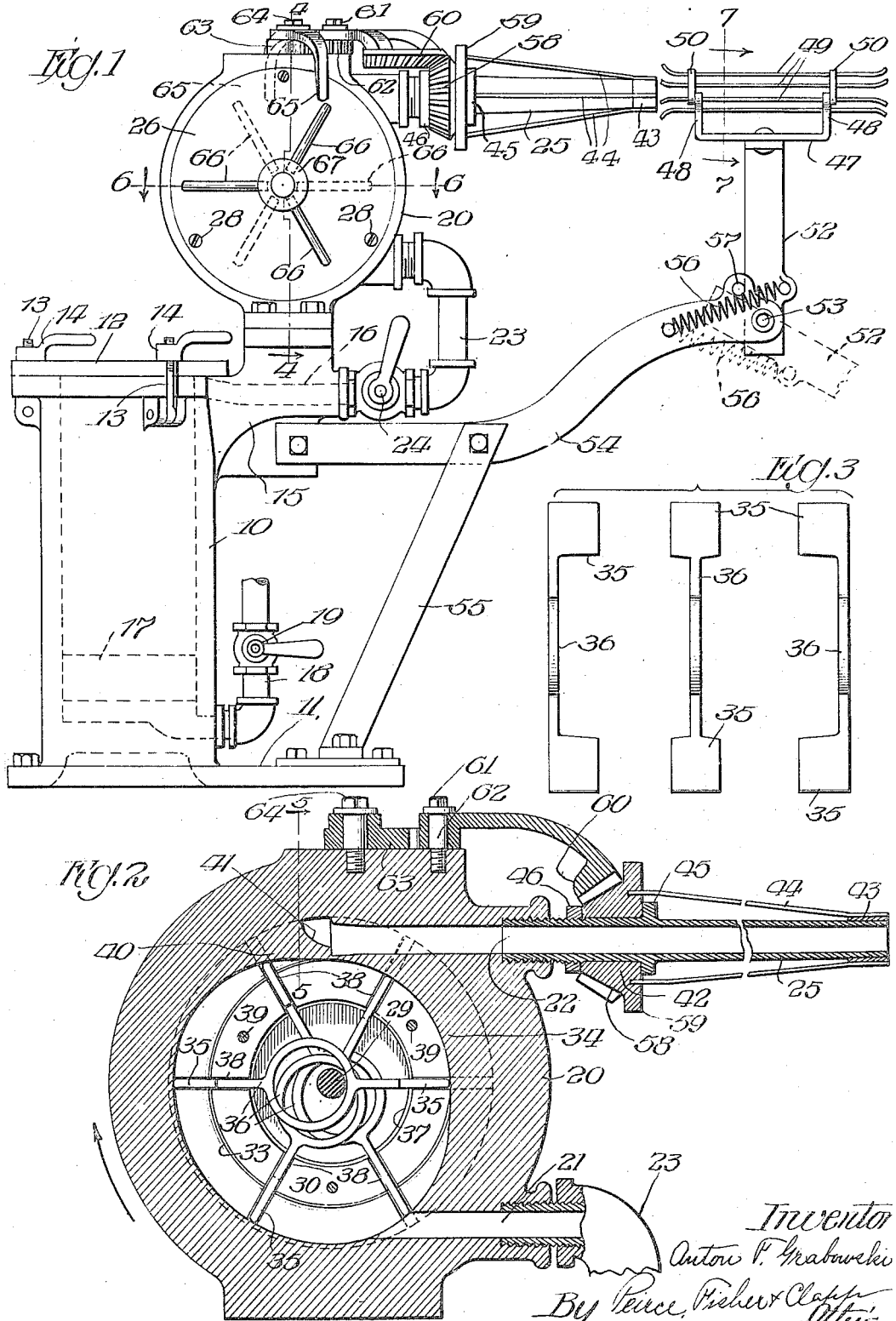

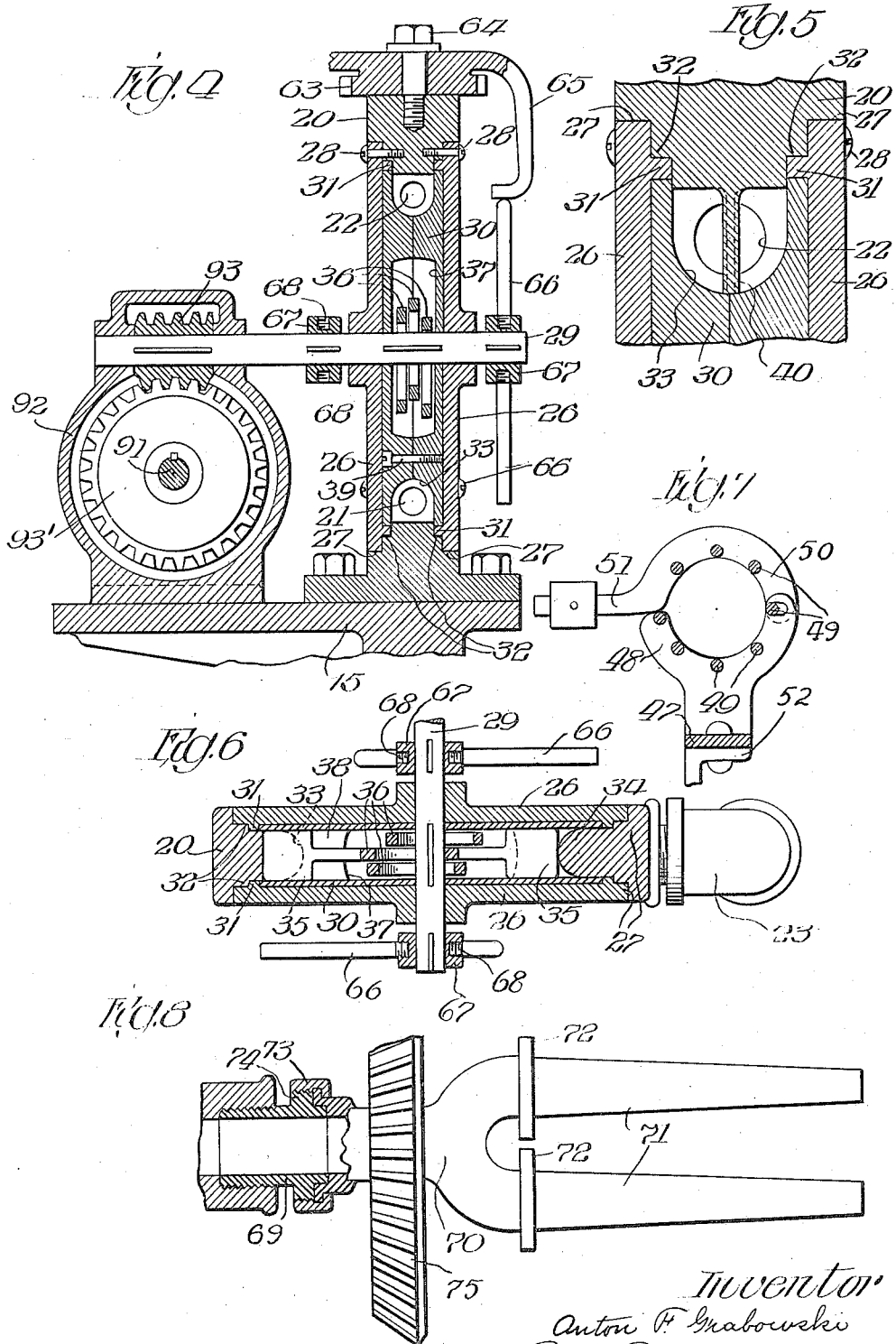

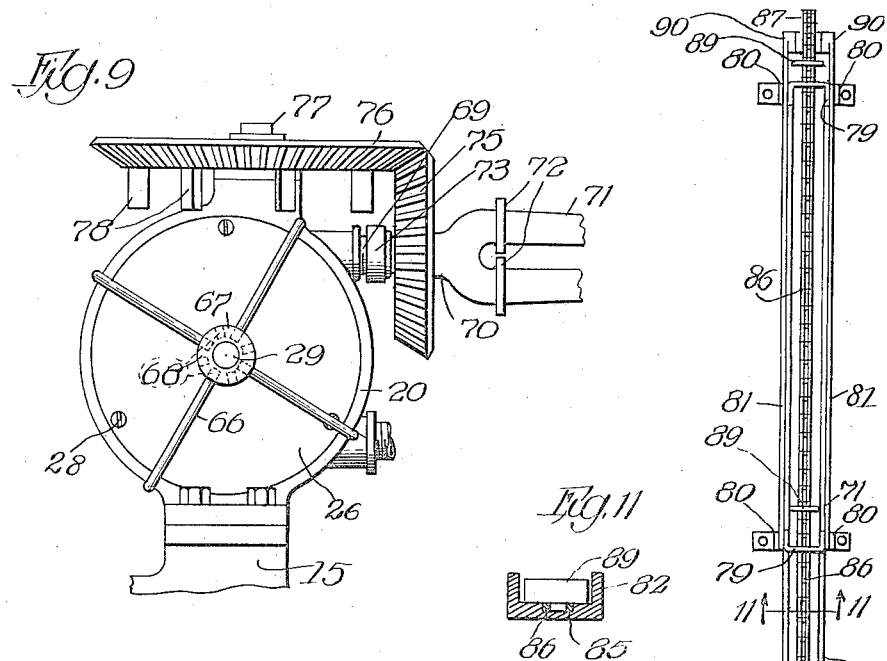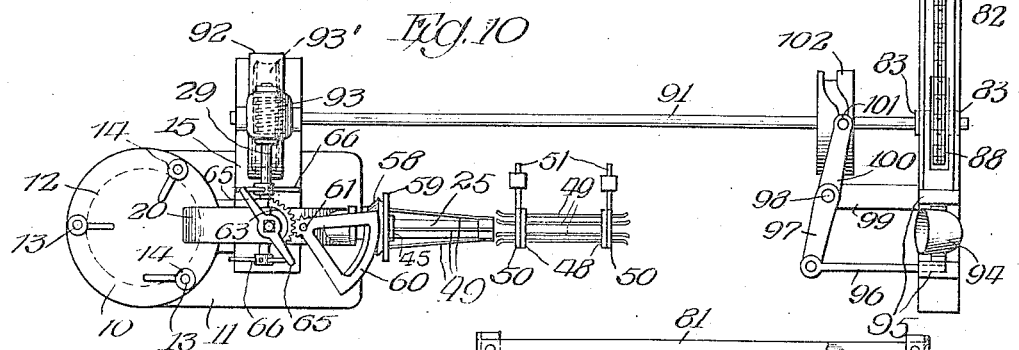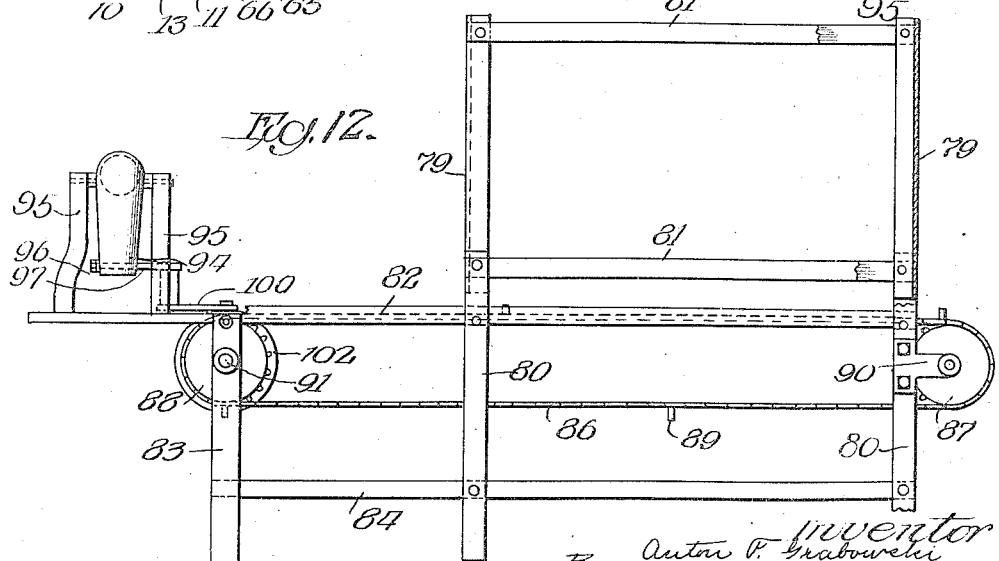

ANTON F. GRABOWSKI, OF CHICAGO, ILLINOIS, ASSIGNOR TO THE ALLBRIGHT-NELL COMPANY, OF CHICAGO, ILLINOIS, A CORPORATION OF ILLINOIS.

SAUSAGE STUFFING AND LINKING MACHINE.

1,363,505.  Specification of Letters Patent.  Patented Dec. 28, 1920.

Application filed July 28, 1919. Serial No. 313,916.

*To all whom it may concern:*

Be it known that I, ANTON F. GRABOWSKI, a citizen of the United States, and a resident of Chicago, county of Cook, and State of Illinois, have invented certain new and useful Improvements in Sausage Stuffing and Linking Machines, of which the following is a specification.

The invention relates to sausage stuffing and linking machines and seeks to provide improved means of simple construction for automatically twisting the sausage casing to form the separate sausages or links. More particularly, the invention seeks to provide a combined sausage stuffing and linking machine in which the movement of the meat effected by the stuffer automatically controls or times and preferably effects the intermittent operation of the twisting or linking device. With these and other objects in view, the invention consists in the features of improvement hereinafter set forth, illustrated in the preferred form in the accompanying drawings and more particularly pointed out in the appended claims.

In the drawings, Figure 1 is a view in elevation of the improved sausage stuffing and linking mechanism. Fig. 2 is a vertical section of the main parts thereof. Fig. 3 is a detail view of parts shown in Fig. 2. Fig. 4 is a detail section on the line 4—4 of Fig. 1. Fig. 5 is an enlarged detail section on the line 5—5 of Fig. 2. Fig. 6 is a horizontal section on the line 6—6 of Fig. 1. Fig. 7 is a detail section on the line 7—7 of Fig. 1. Fig. 8 is a view partly in section of a twister of modified form. Fig. 9 is an elevation illustrating the modified twister and a modification of the twister operating means. Fig. 10 is a plan view of the improved stuffing and linking machine and of the delivery mechanism therefor. Fig. 11 is a detail section on the line 11—11 of Fig. 10. Fig. 12 is an end view of parts shown in Fig. 10.

The sausage stuffing device is provided with suitable means for forcing the sausage meat therethrough and through the sausage casing. In the form shown a vertical cylinder 10 is provided, this cylinder being mounted or cast in piece with a base 11 and having a cover 12 at its upper end. The cover is removably held in place by eye-bolts 13 and hand nuts 14 by which the cover can be tightly held in position after the cylinder has been filled with the sausage meat. The upper end of the cylinder on one side is provided with an integral bracket 15 having a discharge port 16 extending therethrough and leading from the upper end of the cylinder bore. The meat is forced through the port or passage 16 by means of a piston 17 arranged within the cylinder and adapted to be forced upwardly therein by steam, water or other like medium under pressure and which is admitted to the lower end of the cylinder from a supply pipe 18 having a controlling valve 19 therein.

The meat as it is forced from the cylinder of the stuffer is arranged to actuate a rotary member which in turn controls or effects the intermittent operation of the twister for the sausage casing. The rotary member is preferably in the form of a wheel arranged within a circular casing 20 which is mounted, as shown, upon the bracket 15. The casing is provided with inlet and discharge ports 21 and 22, the inlet being connected by a pipe 23 having a valve 24 therein to the discharge port or passage 16 of the cylinder 10 and the discharge port 22 of the casing being connected to a nozzle 25 through which the meat is forced into the sausage casing.

The body of the casing 20 is annular and circular heads or face plates 26 are arranged within seats 27 formed in the body of the casing, the plates being held in place by screws 28. A transverse shaft 29 is journaled in bearings formed centrally upon the plates or heads 26 and a rotatable member or wheel 30 is keyed thereto. The opposite side faces of the wheel 30, or at least the portions thereof adjacent its periphery, snugly fit the inner faces of the plates 26 and the periphery of the wheel snugly fits within annular ribs 31 formed upon the inner faces of the plates 26 adjacent their edges and seated within rabbets 32 formed in the annular body of the casing. The wheel is provided with a peripheral groove 33 and the annular casing 20 is provided with a segmental rib 34 extending between its inlet and outlet passages and which snugly fits within the groove 33 of the wheel 30. By this construction, a passage for the meat is formed through the casing from the inlet port 21 to the outlet port 22 and a curved portion of this passage extends through substantially a semi-circle about the periphery of the wheel.

The wheel is provided with blades or projections which are arranged to be engaged by the meat forced through the passage of the casing to thereby rotate the wheel. Preferably, the blades are movable and are adapted to be projected and withdrawn from the passage through which the meat is forced. In the preferred construction shown, there are six blades 35 provided and they are mounted upon the opposite ends of three carrying members 36. The latter have circular central portions which are arranged in a central cavity 37 within the wheel and extend about the shaft 29 and the blades are guided in radial slots 38 formed in the wheel between its central cavity and its peripheral groove 33. To permit the assembling of the blades and blade carrying members within the wheel, the latter is centrally split in a plane at right angles to its axis and the carrying members and blades are arranged as most clearly shown in Figs. 2 and 3. That is to say, as shown in Fig. 3, one carrying member is centrally disposed with reference to the blades mounted thereon and the other carrying members extend between the opposite edges of the blades. The two sections of the wheel when assembled are secured together by screw bolts 39.

The discharge passage or port 22 extends through the upper portion of the rib 34 of the casing and the inlet passage opens into the groove about the wheel at a point adjacent the lower end portion of the rib 34, which is tapered as most clearly shown in Fig. 2. As the wheel rotates, the blades 35 are moved into and out of the path of the meat by a cam or rib 40 formed on the upper inner portion of the annular casing 20 and which projects into the groove of the wheel in front of the inner end of the outlet port or passage 22. As a blade on one end of the carrier passes beneath this rib, it is forced out of the path of the meat and the blade on the other end of the carrier is forced into the path of the meat at a point adjacent the inlet port 21. It is obvious that with the arrangement shown, the wheel will be rotated by the meat forced through the casing in the direction indicated by the arrow in Fig. 2. The rib 40 is tapered in the direction of movement of the wheel so that the end portion thereof in front of the inner end of the outlet port or passage 22 is quite thin (see Fig. 5) and will not obstruct the passage of the meat therethrough. Preferably, also, as indicated, this end of the rib is cut away as shown at 41, for the same purpose.

The twister for forming the sausage links is controlled or timed in operation by the wheel 30 and is preferably rotatably mounted upon the discharge nozzle 25 of the casing within which the wheel is arranged. In the form shown in Figs. 1 and 2, the twister comprises two collars 42 and 43 which are rotatably mounted on the inner and outer ends, respectively, of the nozzle 25. These collars are connected by a series of longitudinally extending wires 44 and the twister is held in place by a flange 45 on the nozzle and a nut or washer 46 threaded thereon, the flange and washer being in engagement with the opposite ends of the collar 42. The collar 43 is arranged adjacent the outer end of the nozzle and the longitudinally extending wires 44 are arranged closely adjacent the periphery of the nozzle and are preferably tapered or inclined, as shown, from the inner to the outer end of the twister, so that the sausage casing may be conveniently drawn over and puckered upon the wires 44 of the twister in position to receive the sausage meat as it is forced through the nozzle.

A clamp or holding device for engaging the filled sausage casing is arranged adjacent the outer end of the twister. In the form shown, this clamp comprises a lower U-shaped member 47 having upright ends terminating in semi-circular portions 48 (see Fig. 7), the latter being connected by a series of longitudinally extending wires 49. The upper member comprises a similar series of semi-circular wires 49 and two semi-circular end members 50, the upper member being hinged to the lower member by one of the wires. As preferably shown, the upper member of the clamp is provided with laterally extending, weighted projections 51 and the inner ends of the wires 49 are arranged closely adjacent and about the outer ends of the nozzle and twister and flare outwardly as shown. The upper member of the clamp can be readily lifted to receive the stuffed sausage casing and when lowered, the wires of the clamp member will engage the same and hold it against rotation. Then, by intermittently rotating the twister and the unfilled portion of the casing carried thereby, the latter will be twisted at intervals to form the sausage links. While the clamp will exert sufficient pressure on the stuffed sausage casing to properly coöperate with the twister in linking the sausage casing, it will not interfere with the forward movement thereof. That is to say, the longitudinally extending wires of the twister and of the clamp device, while engaging the sausage casing sufficiently firmly to effect the twisting thereof, will readily permit its forward movement as the meat is forced into the casing.

The clamp device is mounted upon a shiftable support or upright 52 which is connected by a pivot 53 to the end of the bar or member 54 which projects laterally and upwardly from the bracket 15 and is connected by a brace 55 to the base plate 11. A spring 56 extending between the bar 54 and the upright 52 normally holds the latter in upright position against a stop 57. The upright can be swung to the position shown in dotted lines to bring its lower end against the stop 57 and, since during this movement, the spring 56 swings across the axis of the pivot 53, it will then serve to hold the upright and the clamp mounted thereon in idle position. The clamp device is thus adapted to be moved away from normal position in front of the nozzle and twister so that the sausage casing can be readily placed upon the latter.

Various suitable means may be provided whereby the timing and preferably, also, the operation of the twister for the sausage casing is effected by means of the rotating member or wheel 30. In the form shown, collar 42 of the twister is provided with beveled gear teeth 58 and a flange 59 on the collar serves to limit the inward movement of the sausage casing when the same is placed upon the twister. A segmental beveled gear 60 meshes with the gear or pinion 58 and is carried upon a vertical pivot or axis 61 which is fixed to the upper portion of the casing 20. Gear teeth 62 on the inner portion of the segment gear 60 mesh with the teeth of a segment gear 63 which is carried upon the upper portion of the casing 20 upon a vertical stud or axis 64. The latter is provided with oppositely projecting, downturned abutments or arms 65 which are arranged to be engaged by a series of tappets 66 on the shaft 29 of the wheel 30. These tappets are mounted upon hubs 68 which in turn are mounted upon the opposite projecting ends of the shaft 29.

In the form shown, there are three tappets on each side of the casing and the tappets on opposite sides are staggered or alternately arranged so that as the wheel 30 is continuously rotated in one direction by the meat as it is forced through the stuffer, the gear segment or member 63 is oscillated intermittently and alternately in opposite directions by means of the tappets 66. In this way, the twister is rotated intermittently to twist the sausage casing at intervals and the rotating or twisting action is effected first in one direction and then in the other so that any tendency of the casing to untwist is thereby avoided. Since the operation of the twister is controlled by the movement of the meat through the stuffer, it will be properly timed in operation to form links of uniform length. The twister operating or controlling mechanism is preferably adjustable to vary the length of the links as desired. For this purpose, the hubs 67 in the form shown are keyed to the shaft 69 and are provided with a plurality of sockets 68 into which the tappets are threaded and the tappets may be varied in number and variously disposed or adjusted in the sockets of the hubs to vary the operation of the twister and the length of the sausage links as desired.

A modified form of twister and operating means therefor is shown in Figs. 8 and 9, the other parts being similar in construction to those already described. In this form, the nozzle or discharge pipe 69 leading from the casing 20 is relatively short and the twister 70 is in the form of a hollow forked member having two tapering, longitudinally extending members 71 provided with flanges 72 at their inner ends and over which two sausage casings are drawn. The twister is rotatably mounted on the end of the nozzle or discharge pipe 69 and is held in place thereon by a coupling member 73 threaded on a flange 74 on the discharge pipe. A beveled gear 75 on the nozzle is arranged to be engaged by a beveled drive gear 76. The latter is mounted on a stud 77 which is fixed to the upper portion of the casing 20 and is provided with a series of lugs 78 which are arranged to be engaged by tappet arms 66 on one end only of the shaft 29. In this form, the twister is intermittently operated but its rotation is always in the same direction and the links are formed by twisting two of the casings together at intervals.

For convenience in smoking or curing the linked sausages, they are delivered onto a series of sticks. The latter are carried in a rack consisting of two upright channel bars 79 (see Figs. 10 and 12) which are mounted on uprights 80 and connected by horizontal members 81. A horizontal guide or channel 82 is mounted on the uprights 80 below the lower ends of the channels 79 and the inner end thereof is mounted upon uprights 83. Brace bars 84 connect the lower ends of the uprights 80 and 83. A groove or channel 85 in the lower portion of the guide member 82 is arranged to receive the upper reach of a belt or sprocket chain 86 which passes over two sprocket wheels 87 and 88 and is provided at intervals with lugs 89 which are arranged to engage the sticks in the channels 79 and advance them laterally one at a time. The sprocket wheel 87 is journaled in brackets 90 on one pair of uprights 80 and the wheel 88 is mounted on a shaft 91 which is journaled at one end in uprights 83 and at its opposite end in a casing 92 mounted on the bracket 15 (see Figs. 4 and 10). The shaft 29 which is rotated by the wheel 30 extends within the upper portion of the casing and carries a worm 93 which meshes with a worm wheel 93' within the casing and fixed to the shaft 91. By this means, the shaft 91 is slowly rotated during the operation of the machine to advance the sticks one at a time beneath a tubular guide 94. The latter is pivotally mounted at its upper end on a pair of uprights 95 which project upwardly from the guiding channel 82. A link 96 connects the lower end of the guide to a rock arm 97 fixed to the upper end of a short vertical shaft 98. The latter is journaled in a bracket 99 and is provided at its lower end with a rock arm 100 having a pin or roller 101 which engages a grooved cam 102 on the shaft 91. The guide 94 is thus oscillated and the linked sausages which pass from the clamp device passing downwardly therethrough, are thereby looped over the sticks as the latter are advanced through the guideway 85 by the chain 86.

Numerous changes may be made without departure from the essentials of the invention as defined in the claims.

I claim as my invention:

1. In a sausage stuffing and linking machine, the combination with a nozzle for receiving the sausage casing and means for forcing sausage meat through said nozzle, of a member adapted to be actuated by the movement of the meat, and means controlled by said member for twisting the casing at intervals.

2. In a sausage stuffing and linking machine, the combination of a casing having a passage therein, a terminal nozzle for receiving the sausage casing, means for forcing meat through said passage and said nozzle, a member actuated by the movement of the meat through said passage, and means controlled by said member for twisting the sausage casing at intervals.

3. The combination with a sausage stuffer and an intermittently operated linking mechanism, of a rotatable member actuated by the movement of the sausage meat effected by said stuffer and controlling the intermittent operation of said linking mechanism.

4. In a sausage stuffing and linking machine, the combination of a casing having a meat supply passage therein, a nozzle for receiving the sausage casing communicating with said passage, a rotatable member in said casing arranged to be actuated by the meat moving through said passage, a twister for forming the sausage links, and means actuated by said rotatable member for controlling the intermittent operation of said twister.

5. In a sausage stuffing and linking machine, the combination of a casing having a meat supply passage therein, a nozzle for receiving the sausage casing communicating with said passage, a rotatable member in said casing arranged to be continuously driven by the meat moving through said passage, a twister for the sausage casing, and means actuated by said continuously rotating member for effecting the intermittent operation of said twister.

6. In a sausage stuffing and linking machine, the combination of a casing having a meat supply passage therein, a nozzle for receiving the sausage casing communicating with said passage, a rotatable member in said casing arranged to be continuously driven by the meat moving through said passage, a twister for the sausage casing, and means actuated by said continuously rotating member for effecting the intermittent operation of said twister, said means being adjustable to vary the operation of said twister.

7. In a sausage stuffing and linking machine, the combination of a stuffer comprising a casing, a nozzle for receiving the sausage casing, a rotatable member in said casing, the latter having a meat supply passage therein communicating with said nozzle and provided with a curved portion extending partially about the periphery of said rotatable member, a series of blades movably mounted in said rotating member, adapted to be projected into and withdrawn from the curved portion of said passage and acted upon by the meat moving therethrough to rotate said member, a twister for the sausage casing, and means actuated by said member for controlling the intermittent operation of said twister.

8. In a sausage stuffing and linking machine, the combination of a casing having a meat supply passage therein, a nozzle for receiving the sausage casing communicating with said passage, a rotatable member in said casing arranged to be continuously driven by the meat moving through said passage, a twister for the sausage casing, a shaft journaled in the casing whereon said member is mounted, tappets in said shaft, and means actuated thereby for intermittently actuating said twister.

9. In a sausage stuffing and linking machine, the combination of a casing having a meat supply passage therein, a nozzle for receiving the sausage casing communicating with said passage, a rotatable member in said casing arranged to be actuated by the meat moving through said passage, a twister for the sausage casing, and means controlled by said member for rotating said twister intermittently and in opposite directions.

10. In a sausage stuffing and linking machine, the combination of a casing having a meat supply passage therein, a nozzle for receiving the sausage casing communicating with said passage, a rotatable member in said casing arranged to be continuously driven by the meat moving through said passage, a twister for the sausage casing, a shaft journaled in the casing wherein said member is mounted, and means on said shaft for rotating said twister intermittently and alternately in opposite directions.

11. In a sausage stuffing and linking machine, the combination of a casing having a meat supply passage therein, a nozzle for receiving the sausage casing communicating with said passage, a rotatable member in said casing arranged to be continuously driven by the meat moving through said passage, a twister for the sausage casing, a shaft journaled in the casing wherein said member is mounted, tappets in said shaft, and means actuated thereby for intermittently actuating said twister, said tappets being adjustable to vary the operation of said twister.

12. In a sausage stuffing and linking machine, the combination of a stuffer having a discharge nozzle over which the unfilled sausage casing is drawn, a twister rotatably mounted on said nozzle and arranged to engage the sausage casing thereon, a clamp adjacent the outlet of said nozzle for engaging the filled casing and holding the same against rotation, and means for intermittently rotating said twister.

13. In a sausage stuffing and linking machine, the combination of a stuffer having a discharge nozzle over which the unfilled sausage casing is drawn, a twister rotatably mounted on said nozzle and arranged to engage the sausage casing thereon, a clamp adjacent the outlet of said nozzle for engaging the filled casing and holding the same against rotation but arranged to permit the forward movement thereof, and mechanism for rotating said twister intermittently and alternately in opposite directions.

14. In a sausage stuffing and linking machine, the combination of a stuffer having a discharge nozzle, a twister rotatably mounted on said nozzle and over which the unfilled sausage casing is drawn, a clamp adjacent the outlet of said nozzle and arranged to engage and hold the filled sausage casing against rotation, and mechanism for intermittently rotating said twister.

15. In a sausage stuffing and linking machine, the combination with a stuffer, having a discharge nozzle, of linking mechanism comprising a rotatable twister, and a cooperating clamp, said twister and said clamp each having a series of longitudinally extending members arranged to engage the sausage casing to hold the same against relative rotary movement but permitting the forward longitudinal movement thereof.

16. In a sausage stuffing and linking machine, the combination with a stuffer, having a discharge nozzle, of linking mechanism comprising a twister for engaging the sausage casing, and a cooperating clamp comprising a series of longitudinally extending wires arranged to engage the casing to hold the same against rotation but permitting the forward longitudinal movement thereof.

17. In a sausage stuffing and linking machine, the combination of a stuffer having a discharge nozzle, and a twister rotatably mounted on said discharge nozzle and over which the unfilled sausage casing is drawn, said twister comprising a series of longitudinally extending wires arranged to engage the inner surface of the sausage casing.

18. In a sausage stuffing and linking machine, the combination of a stuffer comprising a casing having a passage therein provided with a discharge nozzle, a twister rotatably mounted on said nozzle, a member actuated by the movement of the sausage meat through said passage, and means actuated thereby for controlling the intermittent operation of said twister.

19. In a sausage stuffing and linking machine, the combination of a stuffer comprising a casing having a passage therein provided with a discharge nozzle, a twister rotatably mounted on said nozzle and over which the unfilled sausage casing is drawn, a rotatable member in said casing adapted to be actuated by the movement of the meat through said passage, and means actuated by said member for effecting the intermittent operation of said twister.

20. In a sausage stuffing and linking machine, the combination of a stuffer comprising a casing having a passage therein provided with a discharge nozzle, a twister rotatably mounted on said nozzle, a shaft journaled in said casing, tappets mounted on said shaft on opposite sides of said casing, and an oscillating member geared to said twister, the latter being mounted on said casing and actuated by said tappets intermittently and alternately in opposite directions.

21. In a sausage stuffing and linking machine, the combination of a stuffer, mechanism for twisting the stuffed sausage casing at intervals, a supply rack for holding sticks, feeding means for removing sticks successively from said rack and advancing the same, and an oscillating member for guiding the linked sausages onto the sticks as they are advanced by said feeding means.

22. In a sausage stuffing and linking machine, the combination of a stuffer, mechanism for twisting the stuffed sausage casing at intervals, a supply rack for holding sticks, feeding means for removing sticks successively from said rack and advancing the same, an oscillating member for guiding the linked sausages onto the sticks, a member actuated by the movement of the sausage meat through said stuffer, and means actuated thereby for effecting the operation of said twisting mechanism, feeding means and said oscillating guide.

23. In a sausage stuffing and linking machine, the combination of a stuffer, mechanism for twisting the stuffed sausage casing at intervals, a supply rack for holding sticks, a feed chain having means for removing sticks successively from said rack and advancing the same, a guide for directing the linked sausages onto the sticks, and means for effecting relative oscillating movement between said guide and the sticks.

24. In a sausage stuffing and linking machine, the combination with a stuffer having a discharge nozzle over which the unfilled sausage casing is drawn, a twister rotatably mounted on said nozzle and arranged to engage the casing thereon, and a clamp adjacent the outlet of said nozzle for engaging the filled casing and holding the same against rotation but arranged to permit the forward movement thereof, said clamp being movable into and out of position in front of said nozzle.

ANTON F. GRABOWSKI.